April 19, 1966     T. G. McKIE ETAL     3,247,049
PRESSURE RELIEF VALVE FOR PAPERMAKING MACHINE HEADBOX
Filed Oct. 8, 1962     4 Sheets-Sheet 1
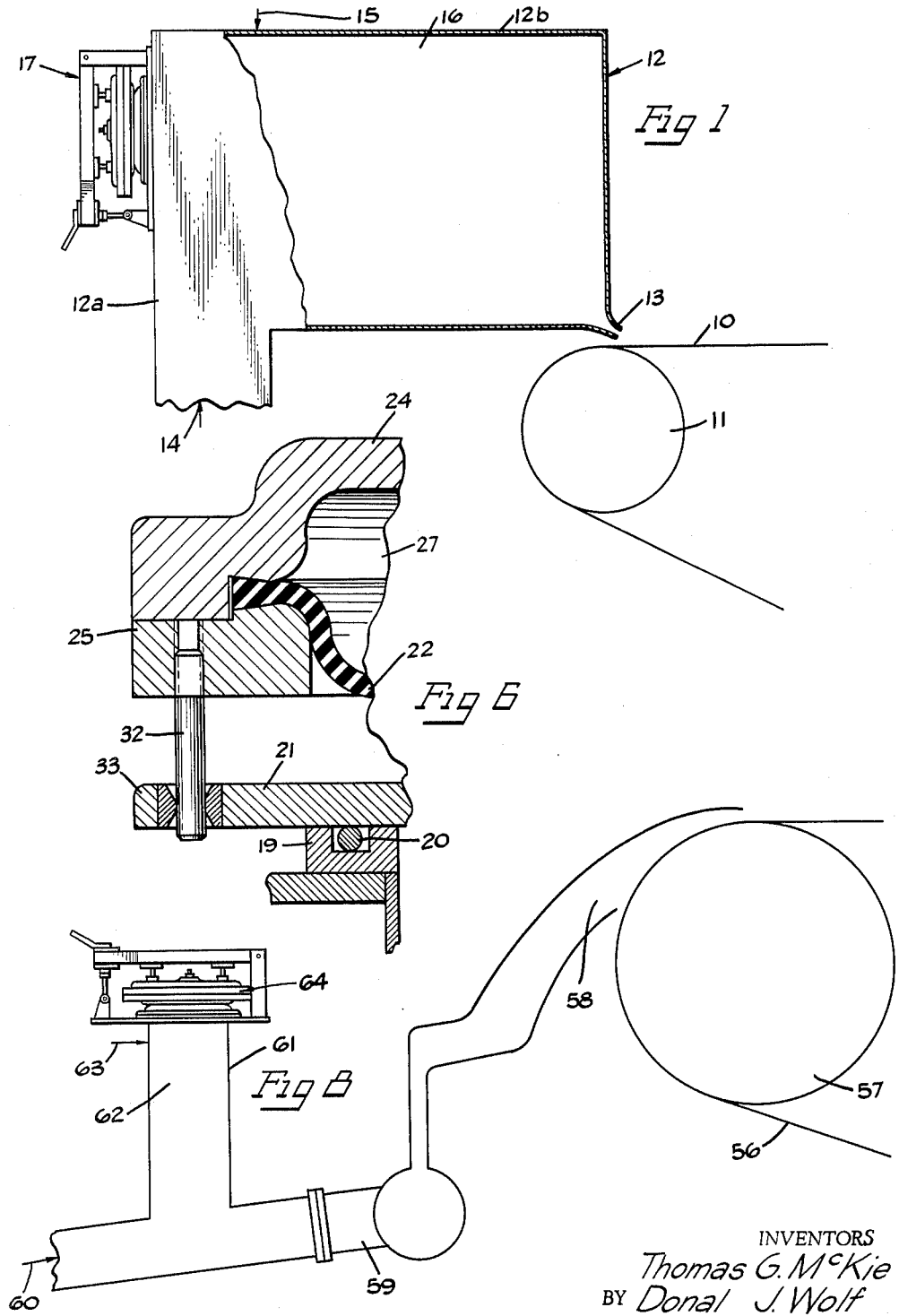
INVENTORS
Thomas G. McKie
BY Donal J. Wolf
Hill, Sherman, Meroni, Gross & Simpson
ATTORNEYS

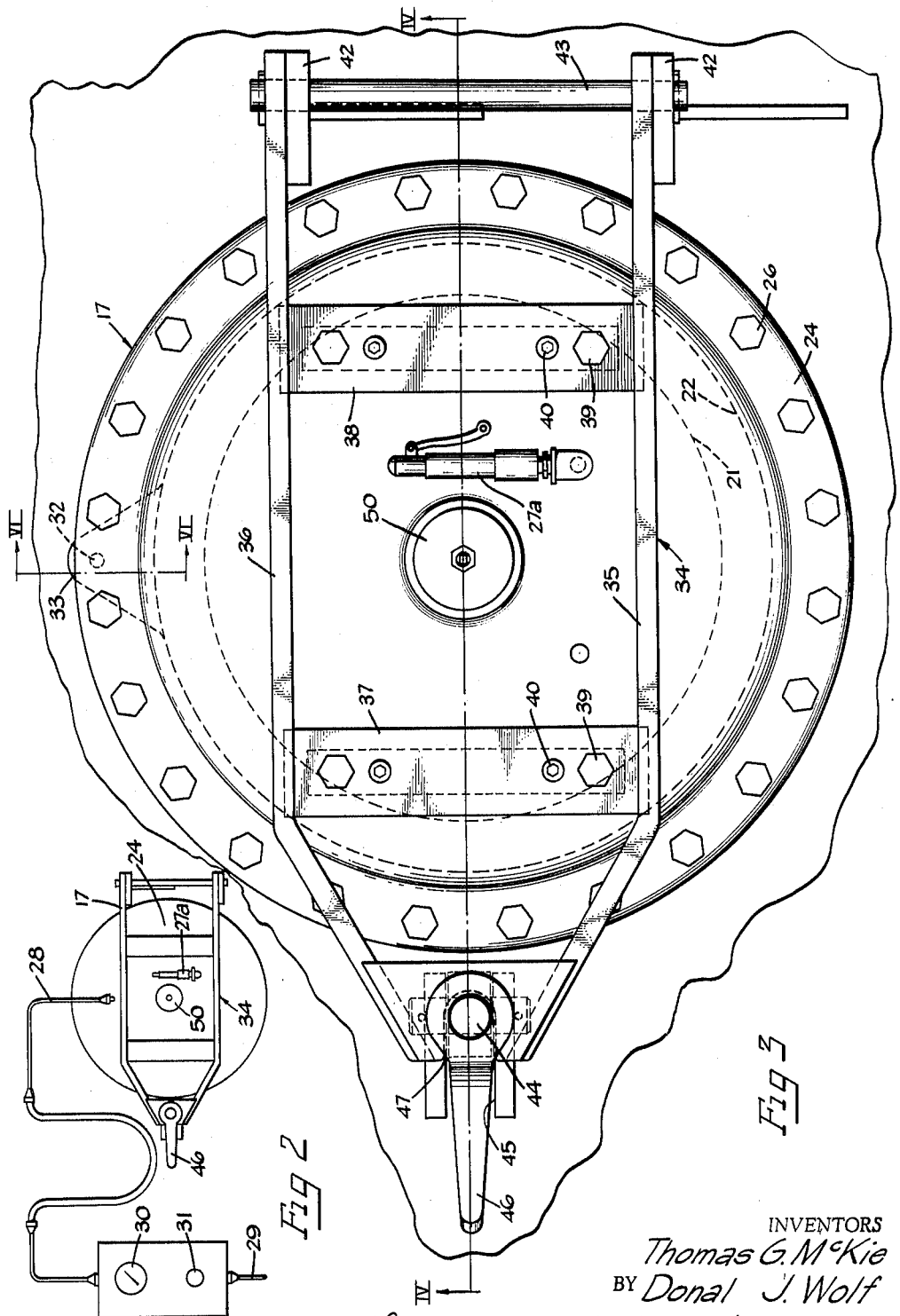

April 19, 1966     T. G. McKIE ETAL     3,247,049
PRESSURE RELIEF VALVE FOR PAPERMAKING MACHINE HEADBOX
Filed Oct. 8, 1962     4 Sheets-Sheet 3
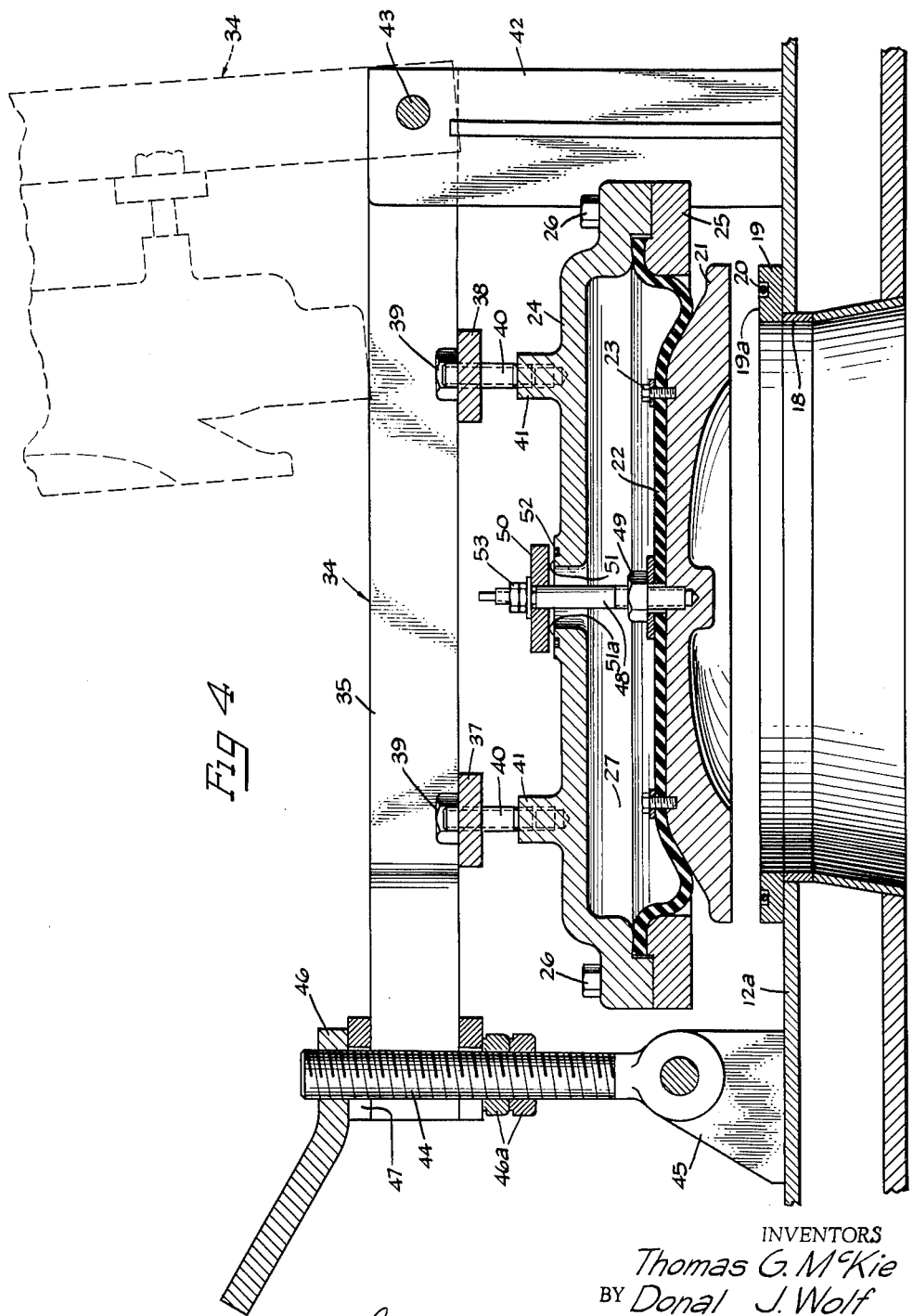
INVENTORS
Thomas G. McKie
BY Donal J. Wolf
Hill, Sherman, Meroni, Gross & Simpson
ATTORNEYS April 19, 1966  T. G. McKIE ETAL  3,247,049
PRESSURE RELIEF VALVE FOR PAPERMAKING MACHINE HEADBOX
Filed Oct. 8, 1962  4 Sheets-Sheet 4
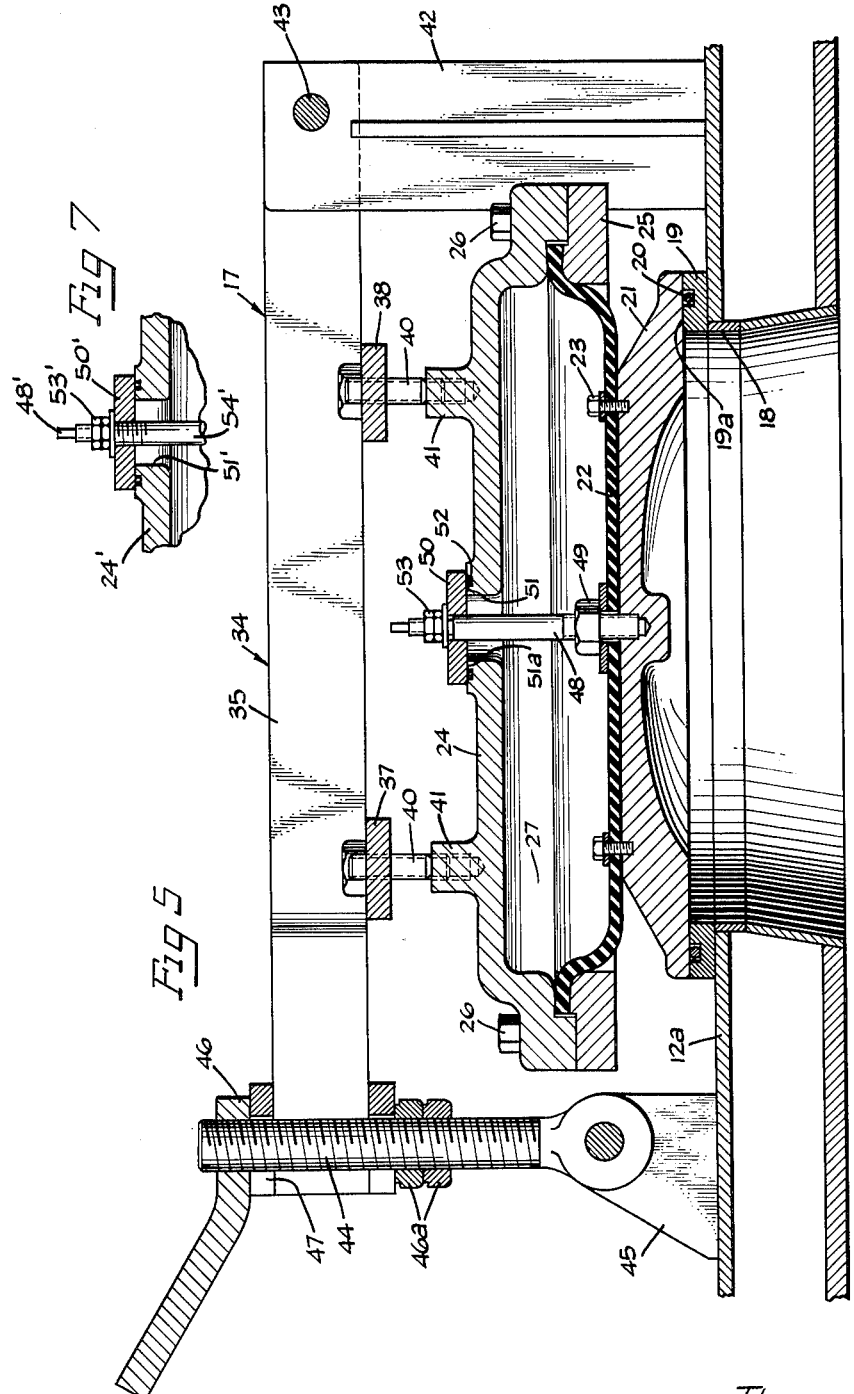
INVENTORS
Thomas G. McKie
BY Donal J. Wolf
ATTORNEYS

United States Patent Office 3,247,049
Patented Apr. 19, 1966

3,247,049
PRESSURE RELIEF VALVE FOR PAPERMAKING MACHINE HEADBOX
Thomas G. McKie and Donal J. Wolf, Beloit, Wis., assignors to Beloit Corporation, Beloit, Wis., a corporation of Wisconsin
Filed Oct. 8, 1962, Ser. No. 229,074
10 Claims. (Cl. 162—259)

The present invention relates to improvements in papermaking machines and particularly to improvements in the distribution and headbox systems for high speed papermaking machines and to a pressure relieve valve having improved features well adapted to use in a headbox.

Pressure relieving valves heretofore available generally provide an opening closed by a member which may be spring loaded or pressure loaded and arranged to yield or move away or burst in the event that a predetermined pressure is exceeded. These valves are often used with pressure vessels which contain both gaseous and liquid phases of fluid. The valves in these situations are required to release only a gas or vapor, or at most a mixture thereof. The present invention provides a valve which operates as a safety valve but is particularly adapted for the solution of problems which have not been generally recognized in the art of papermaking and paper machinery construction.

In modern high speed papermaking, including the speeds now foreseen to be attainable, it becomes necessary to handle large volumes of water and fiber as papermaking stock. These large volumes must be conducted at very high speeds, i.e., as much as one mile per minute or more. For example, in a headbox providing for the handling of stock at rates of 125 gallons per minute per inch of width for a machine having a width up to 350 inches the stock inlet distribution system may be required to handle water and fiber at rates of 43,750 gallons per minute at pressures of 70 p.s.i. and more. The energy content of such a flowing stream presents serious problems in the event of malfunction of some component of the paper machine. An additional hazard is created by the rapid rise of the stock level in the headbox which compresses the air cushion above the stock to pressures which lie beyond the safety limit of the headbox structure.

The papermaking machine headbox is not constructed as a high pressure vessel and cannot sustain high pressures. However, there are situations whereby due to a malfunction the headbox may cease to be a conduit or channel and become a closed vessel. In such event the headbox would necessarily be required to contain the entire energy of the flowing stream during its conversion from velocity energy into pressure energy, and bursting will undoubtedly result.

It is accordingly an important object of the present invention to provide in combination with a stock distribution mechanism for a high speed papermaking machine such as that including a headbox, an opening sized and positioned so as to release at times required a sufficient quantity of air and flowing liquid so that excess energy conversion to pressure is prevented and thereby damage to the equipment and danger to personnel are avoided.

It is a further object of the invention to provide for a pressure relief valve for a headbox which is of a design to be able to serve as an access manhole to said headbox.

It is a further object of the invention to provide for a pressure relief valve arrangement which can function to provide an initial opening when a predetermined pressure is exceeded within the headbox and to thereafter provide for an increasing discharge opening to provide the ability to relieve large volumes of water and air from the headbox in a relatively short time.

A still further object of the invention is to provide a pressure relief valve construction of simplified design to be inexpensive in construction and reliable in operation and which is adapted to being made in a large size so as to provide for an opening of substantial size for permitting the rapid flow of fluid when a predetermined pressure is reached, and also to be capable of being fully opened for complete free access to the valve opening.

A still further object of the invention is to provide an improved pressure relief valve which automatically opens at a predetermined pressure wherein the opening pressure can be rapidly and simply changed.

Other objects, advantages and features will become more apparent with the teaching of the principles of the invention in connection with the disclosure of the preferred embodiments thereof in the specification, claims and drawings, in which:

FIGURE 1 is a side elevational schematic view of a distribution mechanism for a paper machine including a headbox;

FIGURE 2 is a top plan view shown somewhat schematically of a safety relief valve constructed in accordance with the principles of the present invention;

FIGURE 3 is a detailed top plan view of the relief valve;

FIGURE 4 is a sectional view taken substantially along line IV—IV of FIGURE 3;

FIGURE 5 is a sectional view similar to FIGURE 4 but showing the position of the parts when the valve has been closed;

FIGURE 6 is a fragmentary enlarged sectional view taken substantially along line VI—VI of FIGURE 3;

FIGURE 7 is a fragmentary sectional view illustrating a modified form of a portion of the mechanism shown in FIGURE 4; and FIGURE 8 is a schematic side elevational view of another form of stock distribution mechanism embodying features of the invention.

On the drawings:

FIGURE 1 illustrates a stock distribution mechanism for a high speed papermaking machine wherein a layer of stock is deposited on a continuously moving forming surface such as a Fourdrinier wire 10 carried over a breast roll 11. The stock is distributed by a headbox 12 through a slice 13.

Stock is delivered under pressure to the headbox from delivery means indicated generally at 14 which may incorporate a stock pump and the conduit leading to the headbox. The headbox may contain various distributor and rectifier rolls which are omitted. An air dome 16 is maintained in the upper portion of the headbox 12. For obtaining a certain stock velocity at the slice 13 a certain air pressure in the headbox is required and the air dome 16 is maintained above the stock with air forced in through line 15.

In accordance with the present invention a pressure relief valve 17 is mounted on the headbox to communicate with the interior, preferably on the rear wall 12a, as shown, or the top wall 12b. The pressure relief valve provides an opening of manhole size with an arrangement so that the relief valve opens at a predetermined pressure in excess of normal operating pressure, and the preliminary opening of the relief valve is followed by an increased opening of a size sufficiently large to permit the escape of a substantial volume of air from the air chamber 16 and liquid stock from within the head-box in order to take care of the flow coming into the box should the slice 13 be closed due to some malfunction of the machine.

The relief valve is also constructed so that it can be completely opened for use as a manhole for access to the headbox.

As shown in FIGURES 3 through 5, the safety relief valve 17 includes a manhole size opening 18 in the headbox wall 12a. Surrounding the opening on the outer surface of the wall 12a is an annular flange 19 that provides a seat for a safety valve manhole cover or press plate 21. The flange 19 contains a groove in which is positioned a resilient gasket 20 which compresses as the plate 21 is seated against the seating surface 19a of the ring 19.

The plate 21 is carried on a flexible diaphragm 22. The diaphragm is secured to the plate 21 such as by holding bolts 23. The diaphragm is supported on a diaphragm cover 24 and clamped thereto by an annular clamping ring 25 held to the cover 24 by a series of circumferentially spaced bolts 26, FIGURE 3.

An air pressure chamber 27 is thus formed between the diaphragm 22 and the diaphragm cover 24 and this chamber 27 is pressurized to a controlled air pressure which will determine the pressure within the headbox required to lift the plate 21 from its seat.

The air chamber 27 is inflated to a pressure so that a predetermined maximum pressure within the headbox will lift the plate 21. This predetermined maximum pressure is of course above normal operating pressure and will be reached only due to some malfunction such as the flow of stock being stopped.

If the required headbox pressure or normal operating pressure is $P_1$, then the air chamber 27 is inflated to a higher predetermined pressure $P_2$ which is larger than $P_1$ and the difference between $P_2$ and $P_1$ may be referred to as the safety margin. If for some reason the pressure $P_1$ becomes larger than $P_2$ the press plate 21 will be lifted from its seat 19a. The pressure to which the air chamber 27 is inflated will of course take into consideration the area of the flexible diaphragm 22 which is shown as substantially equal to the downwardly facing exposed surface of the plate 21. If the areas are different, a pressure will be inflated into the chamber 27 so that the total force on the diaphragm is such that it will equal the total force exerted beneath the press plate 21 at the predetermined excess pressure within the headbox at which the safety valve is to open.

FIGURE 2 illustrates the arrangement for controlling the safety valve 17, and a line 28 leads into the chamber 27 beneath the diaphragm cover 24, from an air supply line 29. The air supply line 29 feeds to a regulator 31 and a gauge 30 is connected downstream of the regulator. The regulator is set to provide the predetermined pressure $P_2$ which will determine the pressure within the headbox required to open the safety relief valve 17. It should be noted that this is a pressure relief valve and a safety device and not a pressure regulator thus use of the valve is infrequent.

The diaphragm chamber 27 is itself provided with a small pressure relief valve shown at 27a. This valve may be of standard construction and is usually set to open at a pressure one pound higher than the pressure $P_2$ in the diaphragm chamber 27.

To open the manhole cover and manually release the valve the pressure regulator 31 of FIGURE 2 is set to zero and the air pressure is released from the diaphragm chamber by manually operating the diaphragm chamber safety valve 27a to release pressure in the diaphragm chamber 27.

The manhole cover plate 21 is provided with a guide helping maintain it in alignment with the diaphragm cover 24, as shown in FIGURES 3 and 6. A pin 32 is rigidly threaded into the ring 25 and slidingly projects downwardly into an opening in an ear 33 on the plate 21.

The plate 21 is provided with an arrangement so that it can be moved completely away from the manhole opening 18 to provide free access to the headbox 12. For this purpose the assembly is supported on a yoke 34 including arms 35 and 36 with cross members 37 and 38. The diaphragm cover is rigidly supported on the cross members by bolts 39 extending down through the cross members 38 and threaded into ridges 41 on the diaphragm cover 24. Spacer pins 40 are threaded downwardly through the cross members to engage the upper surfaces of the ridges 41 so that the position of the diaphragm cover can be set substantially parallel to the seat 19a for the plate.

The yoke is pivotally supported on brackets 42 on the headbox with a pivotal cross pin 43 extending through the brackets and through the arms 35 and 36. The other pins of the arms are releasably clamped in position by a swing bolt 44 which is pivotally mounted on a bracket 45 on the headbox and swings up into a slot 47 formed between the arms. A handled nut 46 threads onto the swing bolt 44 to clamp the yoke into position, and nuts 46a threaded onto the swing bolt beneath the yoke will establish its spaced position from the headbox.

The diaphragm chamber 27 is provided with a relief valve which opens to rapidly vent the diaphragm chamber as soon as the cover plate 21 is raised off of its seat.

For this purpose a rod 48 is threaded into the cover plate 21 and secured thereto by a lock nut 49 to project upwardly through a valve port 51. Above the valve port is a valve seat 51a with a recess having a resilient ring 52 therein. A valve member 50 is carried on the rod 48 and raises off the valve seat to vent the diaphragm chamber 27. The position of the valve member or plate 50 on the rod 48 is adjusted by nuts 53 threaded onto the rod.

In another arrangement, as illustrated in FIGURE 7, a rod 54' is provided with threads and a valve member or valve plate 50' is adjustably threaded onto the rod 54'. The valve plate 50' is set on the rod so as to close the port 51' in the diaphragm cover 24', and the adjusted position of the valve plate 50' is locked by a lock nut 53' threaded onto the rod 54'.

The valve plate 50 is adjustably set at an axial position of the rod so that it will seat on the seat 51a to close the diaphragm chamber 27 when the cover plate 21 over the manhole 18 is fully seated, FIGURE 5.

In operation, when the pressure in the headbox rises to the predetermined safety valve opening pressure, which is above normal operating pressure, the manhole cover plate 21 will be slightly lifted off of its seat 19a to thus raise the valve member 50 off of its seat 51a. Since the diaphragm chamber 27 is a sealed chamber and little or no air is pumped into the chamber during operation, as soon as the valve 50 opens, the pressure in the chamber will decrease and the pressure differential between the diaphragm chamber 27 and the headbox continuously increases and the rate of opening of the pressure plate 21 will accelerate until the desired relief is obtained. The parts will move to the open position of the valve, as shown in FIGURE 4. Air and papermaking stock will thus be allowed to escape through the manhole opening until the pressure in the system can be reduced to safe limits. To continue normal operation the mechanism is cleaned of paper fibers and the press plate 21 is again seated and the diaphragm chamber 27 again inflated. To obtain access to the headbox through the manhole 18, the diaphragm chamber 27 is deflated and the swing bolt nut 47 is loosened and the swing bolt 44 is swung out of the way with the yoke 34 swung upwardly to the dotted line position shown in FIGURE 4.

The features of the invention may be employed in conjunction with hydraulic type stock inlets, as illustrated in FIGURE 8. In this arrangement a travelling Fourdrinier 56 is carried on a breast roll 57 and supplied stock through a slice having a forming area extending over the portion of the arc of the uprunning side of the breast roll 57. Stock flows through a conduit 59 to the slice 58 from a pressure stock supply 60, and communicating with the conduit is a surge chamber 61 having an air head 62 maintained through an air supply 63. At the top of the surge chamber is a safety valve 64 of the construction of the valve shown in FIGURES 3 through 5.

Thus it will be seen that we have provided an improved flow distribution system which meets the objectives and advantages above set forth. The arrangement provides a solution to a problem which has not been fully heretofore recognized and provides an improved safety valve structure well adapted for use in the combination set forth and for other uses.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a stock distribution mechanism for a high speed papermaking machine including,
   means defining a manhole opening into a headbox, the combination comprising
   a cover for said opening,
   and a pressure responsive releasable support for said cover for holding it over the manhole and releasing the cover at a predetermined pressure within the headbox in excess of a normal operating pressure.

2. In a stock distribution mechanism for a high speed papermaking machine including,
   means defining a manhole opening into a headbox, the combination comprising
   a cover for said opening,
   means defining a pressure chamber outwardly of the manhole for applying a fluid pressure to the outer surface of said cover for holding it over said manhole opening,
   and means for relieving the pressure in said pressure chamber at a predetermined pressure in said headbox in excess of a normal operating pressure.

3. In a stock distribution mechanism for a high speed papermaking machine including,
   a closed headbox having a stock delivering slice for feeding a layer of stock onto a travelling forming surface,
   means for delivering stock under pressure into the headbox,
   means defining a manhole opening into the headbox, the combination comprising
   a cover for said opening,
   a pressure responsive releasable support for said cover for holding it over the manhole opening and releasing the cover at a predetermined pressure in excess of a normal operating pressure within the headbox,
   a pivotal arm secured to said support for moving the support and cover away from the opening for full access thereto,
   and means for locking the pivotal arm in position with the cover over the opening.

4. A pressure release valve mechanism for relieving pressure and permitting the escape of a volume of fluid from a chamber such as a high speed paper machine headbox comprising,
   a member having a port with means defining a seat surrounding the port,
   a movable plate member adapted to engage said seat,
   a flexible diaphragm supporting said plate member for movement relative to said seat, a diaphragm cover supporting the diaphragm and forming a pressure chamber with the diaphragm,
   passage means communicating with said pressure chamber for holding the plate member on said seat,
   means defining a relief valve opening in said diaphragm cover,
   and a valve member positioned to close said valve opening and being connected to said plate member and moved off the valve opening as the plate member is lifted off of said seat by fluid pressure in said port.

5. A pressure release valve mechanism for relieving pressure and permitting the escape of a volume of fluid from a chamber such as a high speed paper machine headbox comprising,
   a member having a port with means defining a seat surrounding the port,
   a movable plate member adapted to engage said seat,
   a resilient gasket between said seat and plate member accommodating axial movement of the plate member toward the seat after engaging the gasket,
   a flexible diaphragm supporting said plate member for movement relative to said seat,
   a diaphragm cover supporting the diaphragm and forming a pressure chamber with the diaphragm,
   passage means communicating with said pressure chamber for holding the plate member on said seat,
   means defining a relief valve opening in said diaphragm cover,
   a valve member positioned to close said valve opening,
   and a rigid rod member connected to the valve member and the plate member so that the valve opening will be closed and the port will be closed with fluid pressure in the pressure chamber and so that the relief valve opening will be opened as the plate member moves away from the seat.

6. A pressure release valve mechanism for relieving pressure and permitting the escape of a volume of fluid from a chamber such as a high speed paper machine headbox comprising,
   a member having a port with means defining a seat surrounding the port,
   a movable plate member adapted to engage said seat,
   a flexible diaphragm supporting said plate member for movemnt relative to said seat,
   a diaphragm cover supporting the diaphragm and forming a pressure chamber with the diaphragm,
   passage means communicating with said pressure chamber for holding the plate member on said seat,
   means defining a relief valve opening in said diaphragm cover,
   a valve member positioned to close said valve opening,
   a rigid rod member secured to the plate member and movable therewith,
   and means adjustably mounting said valve member on the rod member for moving the valve member away from the relief valve opening as the plate member moves away from said seat.

7. A pressure release valve mechanism for relieving pressure and permitting the escape of a volume of fluid from a chamber such as a high speed paper machine headbox in accordance with claim 6 wherein said mounting means for said valve member comprises the valve member being adjustably threaded onto the rod member to vary its position on the rod member so that its position relative to the relief valve opening changes with rotation relative to the rod member.

8. A pressure release valve mechanism for relieving pressure and permitting the escape of a volume of fluid from a chamber such as a high speed paper machine headbox in accordance with claim 6 in which the means for adjustably mounting the valve member on the rod includes a nut threaded on the rod with the valve member being slidable on the rod beneath the nut so that its position can be adjusted with rotation of said nut.

9. In a stock distributor mechanism for a high speed papermaking machine the combination comprising,
   a stock delivery slice for feeding a layer of stock onto a travelling forming surface,
   a pressure supply means for said stock,
   a flow conduit leading from the supply means to said slice and conducting stock under pressure,
   a surge chamber communicating with the conduit means and providing an air head for stock in the chamber,
   and a pressure relief valve connected to said surge chamber and opening to relieve pressure within the chamber at a predetermined pressure in excess of a normal operating pressure.

10. In a stock distributor mechanism for a high speed papermaking machine including, a closed headbox having a stock delivery slice for feeding a layer of stock onto a travelling forming surface, means for delivering stock under pressure to the headbox, the combination comprising a pressure relief valve in said headbox opening at a predetermined headbox pressure in excess of a normal operating pressure to relieve pressure and conduct stock from the headbox incorporating a member having a port with means defining a seat surrounding the port, a movable plate member adapted to engage said seat, a resilient gasket between said seat and plate member accommodating axial movement of the plate member toward the seat after engaging the gasket, a flexible diaphragm supporting said plate member for movement relative to said seat, a diaphragm cover supporting the diaphragm and forming a pressure chamber with the diaphragm, passage means communicating with said pressure chamber for holding the plate member on said seat, means defining a relief valve opening in said diaphragm cover, a valve member positioned to close said valve opening, and a rigid rod member connected to the valve member and the plate member so that the valve opening will be closed and the port will be closed with fluid pressure in the pressure chamber and so that the relief valve opening will be opened as the plate member moves away from the seat.

References Cited by the Examiner
UNITED STATES PATENTS

| | | | |
|---|---|---|---|
| 1,602,545 | 10/1926 | Murphy | 162—232 |
| 1,777,611 | 10/1930 | Grobek | 137—528 |
| 2,156,445 | 5/1939 | Baxter | 162—339 |
| 2,561,013 | 7/1951 | Coghill et al. | 162—232 |
| 2,651,323 | 9/1953 | D'Auriac | 137—528 |
| 2,782,692 | 2/1957 | Boronow et al. | 162—339 |
| 2,840,103 | 6/1958 | Gerhardt | 137—467 |
| 2,934,141 | 4/1960 | Ikavalko | 162—339 |
| 2,971,580 | 2/1961 | Beachler et al. | 162—340 |
| 2,979,130 | 4/1961 | Smith | 162—340 |
| 3,028,911 | 4/1962 | De Lear | 162—228 |

DONALL H. SYLVESTER, *Primary Examiner.*
WILLIAM F. O'DEA, MORRIS O. WOLK, *Examiners.*